United States Patent
Bretches et al.

(10) Patent No.: US 6,503,996 B1
(45) Date of Patent: Jan. 7, 2003

(54) HIGH-UNIFORMITY SPANDEX AND PROCESS FOR MAKING SPANDEX

(75) Inventors: Donald D. Bretches, Waynesboro, VA (US); Gary A. Lodoen, Waynesboro, VA (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/993,169

(22) Filed: Nov. 14, 2001

(51) Int. Cl.[7] .................................................. C08G 18/10
(52) U.S. Cl. ............................ 528/49; 528/61; 528/906
(58) Field of Search ............................. 528/49, 906, 61

(56) References Cited

U.S. PATENT DOCUMENTS

| | | |
|---|---|---|
| 3,184,426 A | 5/1965 | Thoma et al. |
| 3,384,623 A | 5/1968 | Inoue et al. |
| 3,994,881 A | 11/1976 | Altau et al. |
| 4,871,818 A | 10/1989 | Lodoen |
| 4,973,647 A | 11/1990 | Bretches et al. |
| 5,000,899 A | 3/1991 | Dreibelbis et al. |
| 5,032,664 A | 7/1991 | Frauendorf et al. |
| 5,589,563 A | 12/1996 | Ward et al. |
| 5,948,875 A | 9/1999 | Liu et al. |
| 5,981,686 A | 11/1999 | Waldbauer, Jr. |

FOREIGN PATENT DOCUMENTS

| | | |
|---|---|---|
| GB | 1102819 | 2/1968 |
| GB | 1118735 | 7/1968 |
| GB | 1118737 | 7/1968 |
| GB | 1153739 | 5/1969 |
| JP | 2-51518 | 2/1990 |
| JP | 7278246 | 10/1995 |
| JP | 8-20625 | 1/1996 |
| JP | 00103831 | 4/2000 |
| WO | WO 9962979 | 12/1999 |

Primary Examiner—Rachel Gorr

(57) ABSTRACT

The invention provides a highly uniform spandex fiber and a method for making it. The polyurethaneurea component of the spandex has both alkylurethane and monoalkylurea ends, with a ratio of monoalkylurea ends to alkylurethane ends of from 0.5:1 to 10:1.

20 Claims, No Drawings

HIGH-UNIFORMITY SPANDEX AND PROCESS FOR MAKING SPANDEX

BACKGROUND OF THE INVENTION

1. Field of the Invention

The present invention relates to a highly uniform spandex and to a process for making such spandex using specific ingredients. More particularly, the polyurethaneurea of which such spandex is comprised has both alkylurethane and monoalkylurea ends, and such ingredients include selected aliphatic primary monoalcohols and aliphatic primary monoamines.

2. Description of Background Art

A variety of polyurethaneurea compositions useful for making spandex are disclosed in U.S. Pat. Nos. 3,994,881; 5,948,875; 5,981,686; 4,871,818; 4,973,647; 5,000,899 and Japanese Published Patent Application JP08-020625. U.S. Pat. No. 5,589,563 discloses the use of surface modifying endgroups, particularly for biomedical polymers. Monofunctional chain terminators are disclosed in U.S. Pat. Nos. 3,384,623; 3,184,426; 5,032,664; British Patent GB 1102819; Japanese Published Patent Applications JP7-278246; JP2000-103831; and JP02-51518 and International Application WO99/62979. British Patents GB1153739; GB118737; and GB1118735 disclose the use of acid and acid-generating compounds in the manufacture of elastic polyurethane filaments.

However, none of the prior art disclosures make possible sufficiently uniform spandex or adequate spandex spinning continuity, and improvements in spandex uniformity and in processes to make spandex are still needed.

SUMMARY OF THE INVENTION

The invention provides a spandex comprising a polyurethaneurea which is the reaction product of:

a) a capped glycol comprising the reaction product of:
  i) a polymeric glycol selected from the group consisting of polyether glycols, polyester glycols, and polycarbonate glycols;
  ii) a diisocyanate; and
  iii) an aliphatic primary monoalcohol comprising 1–10 carbons;
b) an aliphatic diamine chain extender comprising 2–12 carbons; and
c) a primary aliphatic monoamine chain terminator comprising 5–12 carbons;

wherein:
the polyurethaneurea has:
monoalkylurea ends and alkylurethane ends;
a ratio of monoalkylurea ends to alkylurethane ends of at least about 0.5:1; and
a ratio of monoalkylurea ends to alkyurethane ends of at most about 10:1; and wherein the spandex has a coefficient of denier variation which is lower by at least about 15% than that of spandex comprising an otherwise identical polyurethaneurea having dialkylurea and amine ends.

The invention also provides a process for making spandex comprising the steps of:

a) providing a polymeric glycol selected from the group consisting of polyether glycols, polyester glycols, and polycarbonate glycols;
b) providing a diisocyanate;
c) providing an aliphatic primary monoalcohol comprising 1–10 carbons;
d) contacting the glycol, diisocyanate, and monoalcohol to form a capped glycol;
e) providing an aliphatic diamine chain extender comprising 2–12 carbons;
f) providing primary aliphatic monoamine chain terminator comprising 5–12 carbons;
g) contacting the capped glycol, the diamine, and the monoamine in a solvent to form a polyurethaneurea solution; and
h) spinning the polyurethaneurea solution to form the spandex, wherein:
a mole ratio of monoamine to monoalcohol is at least about 0.5:1; and
a mole ratio of monoamine to monoalcohol is at most about 10:1.

DETAILED DESCRIPTION OF THE INVENTION

It has now been found that spandex comprising a polyurethaneurea having alkylurethane and monoalkylurea chain ends at certain ratios has unexpectedly high uniformity. It has also been found that certain combinations of selected aliphatic monoalcohols and aliphatic monoamines, when used in making a polyurethaneurea to be spun into spandex, provide unexpected process advantages.

As used herein, 'spandex' means a manufactured fiber in which the fiber-forming substance is a long chain synthetic polymer comprised of at least 85% by weight of a segmented polyurethane. Polyurethaneureas constitute a subgroup of polyurethanes. "Primary" amine or alcohol means that the amino or hydroxyl group is covalently bonded to a carbon which is in turn covalently bonded to at most one other carbon.

Polyurethaneureas which have been chain-terminated with an aliphatic monoalcohol have alkylurethane ends, and those that have been chain-terminated with an aliphatic primary amine have monoalkylurea ends. Chain termination with (secondary) dialkylamines gives dialkyl urea ends. Amine ends in the polyurethaneurea are derived from incompletely reacted diamine chain extender.

The spandex of the invention comprises a polyurethaneurea having a ratio of monoalkylurea ends to alkylurethane ends of at least about 0.5:1 and at most about 10:1. When the ratio is outside the indicated range, the spandex has low denier (decitex) uniformity. The polyurethaneurea can have at least about 5 meq/kg and at most about 30 meq/kg alkylurethane ends. The polyurethaneurea can have at least about 2 meq/kg monoalkylurea ends and at most about 55 meq/kg monoalkylurea ends, based on polyurethaneurea weight. The polyurethaneurea can have up to about 50 meq/kg amine ends, based on polyurethaneurea weight. The values herein for the various types of polyurethaneurea chain ends include consideration of unreactive ends in the polymeric glycol, which generally amount to less than about 10 meq/kg, based on total ingredients weight or polyurethaneurea weight, as circumstances dictate.

Further, the spandex has a coefficient of denier variation which is lower, by at least about 15% and preferably at least about 25%, than that of spandex comprising an otherwise identical polyurethaneurea having dialkylurea and amine ends. Such a reduction in coefficient of denier variation is significant. Preferably, the spandex has a coefficient of denier variation of at most about 15.

The polyurethaneurea constituent of the spandex of the invention is the reaction product of a) a capped glycol made from a polymeric glycol selected from the group consisting of polyether glycols, polyester glycols, and polycarbonate glycols, a diisocyanate, and an aliphatic primary monoalcohol comprising 1–10 carbons; b) an aliphatic diamine chain extender comprising 2–12 carbons; and c) a primary aliphatic monoamine chain terminator comprising 5–12 carbons.

The process of the present invention comprises contacting a polymeric glycol, an aliphatic primary monoalcohol, and a diisocyanate to form a capped glycol, contacting the capped glycol with an aliphatic diamine chain extender and an aliphatic primary monoamine chain terminator in a solvent, and wet- or dry-spinning the resulting solution of polyurethaneurea to form the spandex. The mole ratio of monoamine to monoalcohol is at least about 0.5:1 and at most about 10:1. When the ratio is too high, the monoalcohol has little effect, and when it is too low, the polyurethaneurea can become insufficiently soluble in the spinning solvent.

Polymeric glycols suitable for use in making the polyurethaneurea of which the spandex of the invention is comprised and in the process of the invention can have number average molecular weights of approximately 1500–4000 daltons and include polyether glycols (for example poly(tetramethyleneether) glycol which can have a molecular weight of 1500–2500 daltons and poly(tetramethyleneether-co-2-methyltetramethyleneether) glycol which can have a weight of 2000–4000 daltons), polycarbonate glycols (for example poly(pentane-1,5-carbonate) glycol and poly(hexane-1,6-carbonate) glycol), and polyester glycols (for example poly(2,2-dimethyl-1,3-propane dodecanedioate) glycol, poly(ethylene-co-1,2-propylene adipate) glycol, poly(hexamethylene-co-2,2-dimethyltrimethylene adipate) glycol, and poly(ethylene-co-butylene adipate) glycol). If desired, poly(2,2-dimethyl-1,3-propane dodecanedioate) glycol can be short-path distilled in one or more steps at reduced pressures and elevated temperatures before being capped with diisocyanate. When poly(tetramethyleneether-co-2-methyltetramethyleneether) glycol is used, the 2-methyltetramethyleneether moiety can be present in a range of approximately 4–20 mol %, based on the total ether moieties in the glycol. Such a copolyether can be prepared by copolymerization of tetrahydrofuran and 3-methyltetrahydrofuran. When poly(ethylene-co-butylene adipate) is used, the ethylene/butylene ratio can be about 50/50 to 70/30, preferably about 60/40.

The primary aliphatic monoalcohol used in making the polyurethaneurea for the spandex of the invention and in the process of the invention comprises 1–10 carbons, preferably 4–7 carbons. Examples of useful monoalcohols include methanol, ethanol, n-butanol, n-hexanol, n-octanol, n-decanol, and mixtures thereof. The monoalcohol can be used in the process at an amount of at least about 5 meq/kg and at most about 30 meq/kg, based on total ingredients. When the amount is too low, the monoalcohol has little effect, and when it is too high, the polyurethaneurea solubility can suffer.

The diisocyanate can be 5-isocyanato-1-(isocyanatomethyl)-1,3,3-trimethylcyclohexane, 1,6-diisocyanatohexane, toluene diisocyanate, 1-isocyanato-4-[(4'-isocyanatophenyl)methyl]benzene, 2,2-bis(4-socyanatophenyl)-propane, 1,1'-methylenebis(4-isocyanatocyclohexane), 1,4-diisocyanato-cyclohexane, 1,4-bis(4-isocyanato-alpha,alpha-imethylbenzyl)benzene, 1-isocyanato-2-[(4'-isocyanato-phenyl)methyl]benzene, and mixtures thereof. "Substantially 1-isocyanato-4-[(4'-isocyanatophenyl)methyl]benzene" means that up to about 3 mole percent of the diisocyanate can be isomers of 1-isocyanato-4-[(4'-isocyanatophenyl)methyl]benzene. Generally, the NCO moiety content in the capped glycol can be about 2 to 6 weight percent, based on capped glycol. When mixtures of 1-isocyanato-4-[(4'-isocyanatophenyl)methyl]-benzene with 1-isocyanato-2-[(4'-isocyanatophenyl)methyl]benzene are used, the 1-isocyanato-2-[(4'-isocyanatophenyl)-methyl]benzene can be present at about 2 to 55 mole percent, preferably about 5 to 30 mol %, based on total diisocyanate, and the NCO moiety in the capped glycol can be present at about 2.0 to 3.5 wt %. Aromatic diisocyanates such as 1-isocyanato-4-[(4'-isocyanatophenyl)methyl]-benzene and mixtures thereof with 1-isocyanato-2-[(4'-isocyanatophenyl)methyl]-benzene are preferred.

In the process of the invention, the capped glycol can be dissolved in a suitable solvent, for example dimethylacetamide ("DMAc"), N-methylpyrrolidone, or dimethylformamide. Optionally, the capping step can be carried out in a solvent, for example dimethylacetamide containing less than about 50 ppm water and less than about 2000 ppm combined formamides and amines, based on solvent weight.

In the process of the invention, the capped glycol is contacted in a solvent with a diamine chain extender and a primary aliphatic monoamine chain terminator to form the polyurethaneurea in solution, which solution is then wet- or dry-spun to form the spandex. The diamine used to make the polyurethaneurea for the spandex of the invention and in the process of the invention comprises 2–12 carbons and can be for example ethylene diamine, 1,3-butanediamine, 1,4-butanediamine, 1,3-diamino-2,2-dimethylbutane, 1,6-hexane-diamine, 1,2-propanediamine, 1,3-propanediamine, N-methylaminobis(3-propyl-amine) 2-methyl-1,5-pentanediamine, 1,5-diaminopentane, 1,3-diamino-4-methylcyclohexane, 1,3-cyclohexanediamine, 1,1'-methylene-bis(4,4'-diaminohexane), 3-minomethyl-3,5,5-trimethylcyclohexane, 1,3-diaminopentane, and mixtures thereof. Diamines other than ethylene diamine are generally considered 'coextenders' and can be used with ethylene diamine in mounts of up to about 20 mole percent, for example in amounts of about 10 to 20 mol %, or in amounts of at most about 10 mole percent of total chain extender, but such diamines can also comprise about 50 mole percent or more of chain extender mixtures, as disclosed in U.S. Pat. Nos. 5,948,875 and 5,981,686. At 'coextender' amounts above about 50 mole percent, when the polymeric glycol is poly(tetramethyleneether) glycol, the NCO content of the capped glycol can be about 2.5 to 6.0 wt %, and when the polymeric glycol is poly(tetramethylene-co-2-methyltetramethyleneether) glycol, the NCO content of the capped glycol can be about 2.0 to 5.5 wt %, based on capped glycol weight.

The primary monoamine chain terminator used to make the polyurethaneurea for the spandex and in the process of the invention comprises 5–12 carbons, preferably 6–7 carbons, for example n-pentylamine, n-hexylamine, cyclohexylamine, n-heptylamine, methylcyclohexylamines (for example 1-amino-3-methylcylohexane, 1-amino-2-methylcyclohexane, and 1-amino-3,3,5-trimethylcyclohexane), n-dodecylamine, 2-aminonorbornane, 1-adamantanamine, and mixtures thereof. Acyclic and monocyclic amines are preferred, due to their greater efficacy. The monoamine can be used in an amount of at least about 2 meq/kg and at most about 55 meq/kg, based on total ingredients.

The intrinsic viscosity of the polyurethaneurea of which the spandex is comprised and which is prepared and spun in the process of the invention can be about 0.90 to 1.20 dl/g, typically 0.95 to 1.10 dl/g.

Optionally, the polymeric glycol can contain acids and acid-producing compounds, which can be added before the capping step, for example phosphoric acid, benzenesulfonic acid, p-toluenesulfonic acid, sulfuric acid, carboxylic acid chlorides and anhydrides as well as phosphoric acid esters, and the like. The acid or acid-producing compound can be used in an amount of at least about 10 and at most about 125 parts per million ("ppm") based on polymeric glycol weight. Phosphoric acid is preferred due to its low corrosivity.

A variety of other additives can also be used in the spandex and the process of the invention, provided they do not detract from its beneficial aspects. Examples include delustrants such as titanium dioxide; stabilizers such as hydrotalcite, mixtures of huntite and hydromagnesite (for example at 0.25 to 1.0 weight percent based on polyurethaneurea), barium sulfate, hindered amine light stabilizers, UV screeners, hindered phenols, and zinc oxide; dyes and dye enhancers; and the like.

Diethylenetriamine can be used, in the chain extension step, at low levels for solution viscosity control, provided the advantages of the invention are not compromised, and in the Examples, 0–125 ppm (based on weight of polymer) were variously used.

In the Examples, polyurethaneurea solution viscosity was determined in accordance with the general method of ASTM D1343-69 with a Model DV-8 Falling Ball Viscometer (Duratech Corp., Waynesboro, Va.), operated at 40° C. and is reported in poise. The highest solution viscosity that could be measured with this instrument was 35,000 poise.

To measure coefficient of denier variation ('CDV'), the first 50 meters of fiber at the surface of a wound spandex package were removed so that inaccuracies resulting from handling damage were avoided. Spandex was then removed for 130 seconds from the package using a rolling take-off and fed across a tensiometer comprising a piezoelectric ceramic pin. The take-up roll's circumference was 50% greater than the feed roll's circumference, and the feed and take-up rolls rotated at the same rpm, so that the polyurethane fiber was stretched to 50% elongation across the tensiometer. The tensiometer measured the tension as the spandex was fed through the rolls. The standard deviation of the tension was divided by the average tension to obtain the coefficient of variation, which was reported as CDV, since denier is directly proportional to the tension. CDV is independent of the linear density units used (denier vs. decitex), and low CDV indicates high fiber uniformity.

The total isocyanate moiety content of the capped glycol (weight percent NCO) was measured by the method of S. Siggia, "Quantitative Organic Analysis via Functional Group", 3rd Edition, Wiley & Sons, New York, pp. 559–561 (1963).

The strength and elastic properties of the spandex were measured in accordance with the general method of ASTM D2731-72. Three filaments, a 2-inch (5-cm) gauge length and a zero-to-300% elongation cycle were used for each of the measurements. The samples were cycled five times at a constant elongation rate of 50 cm per minute using an Instron tensile tester. Load power ("LP"), the stress on the spandex during initial extension, was measured on the first cycle at 200% extension. Unload power ("UP") was measured at an extension of 200% on the fifth unload cycle. Percent elongation at break ("%E") and tenacity at break ("T") were measured on a sixth extension. Tenacity at break, load power and unload power were reported in deciNewtons per tex. Percent set was also measured on samples that have been subjected to five 0–300% elongation/relaxation cycles. The percent set ("% S") was calculated as % S=100($L_f$–$L_o$)/$L_o$, wherein $L_o$ and $L_f$ are respectively the filament (yarn) length, when held straight without tension, before and after the five elongation/relaxation cycles.

Intrinsic viscosity ("IV") of the polyurethaneurea was determined by comparing the viscosity of a dilute solution of the polymer in DMAc to that of DMAc itself at 25° C. ("relative viscosity" method) in a standard Cannon-Fenske viscometer tube according to ASTM D2515 and is reported as dl/g.

In the Tables, "Comp." indicates a comparison example, not of the invention. "Meq/kg" refers to milliequivalents of the stated type of ingredient per kilogram of total ingredients.

EXAMPLE 1

Poly(tetramethyleneether-co-2-methyltetramethyleneether) glycol of 3500 molecular weight having a 2-methyl moiety content of about 12.5% (E. I. du Pont de Nemours and Company) and containing n-hexanol (Aldrich Chemical Co., Inc., 99% purity) at a level of 18 meq/kg based on total ingredients was fed into the mixing zone of a small-scale continuous capping reactor at 50° C. at a rate of 125 g/min together with a stream of 16.52 g/min of 1,1'-methylene-bis(4-isocyanato-benzene) (Dow Chemical Co.) and injected immediately into the reaction zone of the reactor. The mean residence time in the reaction zone was three hours at 90° C. The measured isocyanate content of the resulting capped glycol was 1.80%. The capped glycol was then fed into a rotating mixer at a rate of 111.7 g/min, into which was also fed 190.02 g/min DMAc solvent. The resulting diluted capped glycol was fed into a polymerization reactor into which was cocurrently fed a combined stream of ethylene diamine (99+% purity, Aldrich Chemical Co., Inc.) and cyclohexylamine (99% purity, Aldrich) dissolved in DMAc, at the following rates: 1.233 g/min EDA, 0.220 g/min cyclohexylamine, and 45.94 g/min DMAc. The amount of cyclohexylamine used was 18 meq/kg, based on total ingredients. The resulting polyurethaneurea was calculated to have about 18 meq/kg n-hexylurethane chain ends, 18 meq/kg cyclohexylurea ends, and 13 meq/kg amine ends. The polyurethaneurea solution had a polymer content of 32.5% and the polymer had an intrinsic viscosity of 1.05 dl/g. Into the polymer solution was mixed a DMAc/additives slurry sufficient to produce, in the final spandex, 1.5 wt % Cyanox® 1790 [a hindered phenolic antioxidant, (2,4,6-tris (2,6-dimethyl-4-t-butyl-3-hydroxy-benzyl)-isocyanurate), Cytec Industries], 0.5 wt % Methacrol® 2462B [a registered trademark of E. I. du Pont de Nemours and Company; a polymer of bis(4-isocyanatocyclohexyl)methane and N-t-butyldiethanolamine (3-t-butyl-3-aza-1,5-pentanediol)], 0.4 wt % Cyasorbe® 1164D [2,4-di(2',4'-dimethyl-phenyl)-6-(2"-hydroxy-4"-n-octyloxyphenyl)-1,3,5-triazine, Cytec Industries], and 0.6 wt % silicone oil. The final solution was heated to 80° C., filtered through a bank of five 30 micron porosity-rating 'Dynalloy' cartridge filters arranged in parallel, and dry-spun without difficulty. The spinning productivity was 0.44 kg/hr/threadline, the spinning speed was 690 meters/min, the nitrogen aspiration gas temperature was 400° C. and was supplied at 40 kg/hr, the cell wall temperature was 220° C., and the windup stretch was 28%. The resulting eight 120 denier (133 dtex) coalesced multifilament fibers had 0.4 dN/tex tenacity, 718% elongation, 0.08 dN/tex load power, 0.02 dN/tex unload power, and 21% set. Processing characteristics of the solution are given in Table I.

Comparison Example 1

Example 1 was repeated, but using diethylamine (a secondary monoamine) instead of cyclohexylamine, at a level of 23 meq/kg based on total ingredients. The 0.95 dl/g IV polyurethaneurea was calculated to have about 18 meq/kg n-hexylurethane ends, 23 meq/kg diethylurea ends, 15 meq/kg amine ends, and substantially no monoalkylurea ends, based polyurethaneurea weight. Polymer solution processing characteristics are given in Table I.

Comparison Example 2

Example 1 was repeated, but without any n-hexanol and using, instead of cyclohexylamine, diethylamine at a level of 41 meq/kg, based on total ingredients. The 0.95 dl/g IV polyurethaneurea was calculated to have about 41 meq/kg diethylurea ends, 15 meq/kg amine ends, and substantially no alkylurethane or monoalkylurea ends, based on polyurethaneurea weight. The processing characteristics of the polyurethaneurea solution are given in Table I.

TABLE I

| Example | n-Hexanol, meq/kg | Monoamine Compound | Amount, meq/kg | Spinning breaks, per kg of fiber | Filter pressure drop increase per day, kg/cm² |
| --- | --- | --- | --- | --- | --- |
| 1 | 18 | cyclohexylamine | 18 | 0.001 | 0.14 |
| Comp. 1 | 18 | diethylamine | 23 | 0.010 | 0.70 |
| Comp. 2 | 0 | diethylamine | 41 | 0.019 | 0.84 |

The data in Table I show surprisingly large reductions, when n-hexanol and cyclohexylamine are used, in the frequency of fiber breaks during spinning and in the per day increase in pressure drop across the filter pack just before the spinneret.

EXAMPLE 2

In a series of experiments, poly(tetramethyleneether) glycol of 1800 molecular weight (Terathane® 1800, a registered trademark of E. I. du Pont de Nemours and Company) containing n-hexanol at a level of 12 to 18 meq/kg, based on total polymer ingredients, was metered into the 50° C. mixing zone of a small-scale continuous capping reactor at a rate of 125 g/min together with a metered stream of 28.23 to 28.34 g/min of 1,1'-methylene-bis(4-isocyanatobenzene), depending on the amount of monoalcohol present in the poly(tetramethyleneether) glycol, and injected immediately into the reaction zone of the reactor. The mean residence time in the reaction zone was three hours at 88° C. The measured isocyanate content of the resulting capped glycol was 2.40%. The capped glycol was metered into a rotating mixer at a rate of 111.7 g/min into which was also metered 169.86 g/min DMAc solvent. The resulting dissolved capped glycol was fed into a polymerization reactor into which was cocurrently fed a combined stream of mixed chain extenders (80/20 mole ratio of ethylene diamine/2-methyl-1,5-pentanediamine (Dytek® A, a registered trademark of E. I. du Pont de Nemours and Company)) and cyclohexylamine chain terminator dissolved in DMAc, at the following rates: 2.215 g/min chain extenders, 0.289 g/min to 0.221 g/min cyclohexylamine, and 62.29 g/min DMAc. The level of cyclohexylamine used was 24 to 18 meq/kg, based on total ingredients, for the corresponding 12 to 18 meq/kg monoalcohol, so that the total monofunctional chain terminator remained constant at 36 meq per kg of total ingredients. The polyurethaneurea had an intrinsic viscosity of 1.10 dl/g and was calculated to have about 24 to 18 meq/kg cyclohexylurea ends, 12 to 18 meq/kg n-hexylurethane ends, and 17 meq/kg amine ends, based on polymer weight. The resulting polymer solution had 33% polymer content. A DMAc/additives slurry was mixed into the solution to produce, in the final spandex, 1.5 wt % Cyanox® 1790, 0.5 wt % Methacrol® 2462B, and 0.6 wt % silicone oil. The final solution was heated to 85° C., filtered through a bank of five 30 micron porosity-rating 'Dynalloy' cartridge filters arranged in parallel and dry-spun without difficulty. The spinning productivity was 0.2 kg/hr/threadline, the spinning speed was 740 m/min, the nitrogen aspiration gas was supplied at 415° C. and 45 kg/hr, the cell wall temperature was 230° C., and the windup stretch was 30%. The resulting 40 denier (44 dtex) spandex (coalesced from 4 filaments of 10 denier each) had 1.42 dN/tex tenacity, 490% elongation, 0.16 dN/tex load power, 0.02 dN/tex unload power, and 17% set. Processing results are given in Table II.

Comparison Example 3

Example 2 was repeated, but without the n-hexanol and using, in place of the cyclohexylamine, diethylamine at a level of 36 meq/kg based on total ingredients. The 0.95 dl/g IV polyurethaneurea was calculated to have about 36 meq/kg diethylurea ends, 15 meq/kg amine ends, and substantially no alkylurethane or monoalkylurea ends, based on polyurethaneurea weight. Processing characteristics are given in Table II.

TABLE II

| Example | n-Hexanol, meq/kg | Monoamine Compound | Amount, meq/kg | Spinning breaks, per kg of fiber | Filter pressure drop increase per day, kg/cm$^2$ |
|---|---|---|---|---|---|
| 2 | 12 to 18 | cyclohexylamine | 24 to 18 | 0.022 | 0.77 |
| Comp. 3 | 0 | diethylamine | 36 | 0.028 | 5.84 |

The data in Table II again show the reduction in spinning breaks and especially in the daily increase of the pressure drop across the spinning filters when cyclohexylamine and n-hexanol are used together to make the polyurethaneurea for spinning into spandex.

Examples 3–5 were carried out without added monoalcohol in order to illustrate the effects of using various primary monoamine chain terminators at various milliequivalents of terminator per kg of total ingredients. About 50 ppm diethylenetriamine was added in each Example. Solution viscosity and its behavior over time was used as a measure of polymer solution processability, affecting for example spinneret life and filter pressure drop. The lower the solution viscosity and the slower its rise, the better the processibility.

EXAMPLE 3

DMAc solutions of polyurethaneureas were prepared stepwise as in Example 2 but in a laboratory batch reactor using 1800 molecular weight poly(tetramethyleneether) glycol, 1,1'-methylenebis(4-isocyanatobenzene) (the wt % NCO was 2.65 in the capped glycol), ethylenediamine chain extender (99+% purity, Aldrich) and either n-butylamine (99+% purity, Aldrich), n-hexylamine (99% purity, Aldrich), or cyclohexylamine (99+% purity) chain terminators at various levels. No stabilizers were added. The solutions contained 32 wt % polymer. At 65 meq/kg primary amine, the intrinsic viscosity was 0.71 dl/g; at 55 meq/kg it was 0.8 dl/g; at 45 meq/kg it was 0.91 dl/g; and at 35 meq/kg it was 1.08 dl/g. Each solution without stirring at 50° C. Samples were taken from each solution at one hour, 24 hours, and 48 hours, respectively, and their viscosities were measured using the falling ball method. The resulting solution viscosities are reported in Table III.

TABLE III

| Terminator | Elapsed Time (hr.) | Solution Viscosity (poise) Terminator (meq/kg ingredients) | | | |
|---|---|---|---|---|---|
| | | 65 (Comp.) | 55 | 45 | 35 |
| n-butylamine (Comp.) | 1 | 222 | 516 | 989 | 2328 |
| | 24 | 387 | 5365 | 3874 | 9766 |
| | 48 | 957 | >35000 | >35000 | >35000 |
| n-hexylamine | 1 | 321 | 631 | 1602 | 3544 |
| | 24 | 774 | 1653 | 2710 | 6851 |
| | 48 | 2180 | 4602 | 4677 | 16162 |
| cyclohexylamine | 1 | 292 | 423 | 870 | 3403 |
| | 24 | 320 | 503 | 1243 | 2968 |
| | 48 | 490 | 731 | 1855 | 3846 |

As can be seen by interpolation of the data in Table III, n-hexylamine was much more effective than n-butylamine at controlling solution viscosity, and cyclohexylamine was more effective still. Only at very high terminator levels that gave intrinsic viscosities too low for practical fiber spinning was n-butylamine effective.

EXAMPLE 4

DMAc solutions of polyurethaneureas were prepared substantially as described in Example 3 but with a variety of chain terminators, each at a level of 51 meq/kg of total ingredients. The weight percent NCO in the capped glycol was 2.6. The polyurethaneurea contents in the solutions were 34.5 wt %. The polymers had intrinsic viscosities of 0.8 dl/g. The solutions were held at about 50° C. for one hour and for 168 hours without stirring. Although the intrinsic viscosities were slightly lower than desired for spinning into fiber, the Falling Ball solution viscosities in Table IV are believed to be reliable indicators of the effectiveness of the terminators at improving spandex spinning.

TABLE IV

| | Solution Viscosity (poise) | |
|---|---|---|
| Terminator | 1 Hour | 68 Hours |
| Cyclohexylamine | 992 | 1085 |
| n-Dodecylamine | 1460 | 1637 |
| 2-Aminonorbornane | 959 | 1377 |
| 1-Adamantanamine | 2344 | 5012 |

The solution viscosities in Table IV are far below those observed under comparable conditions in Example 3 for n-butylamine and show that a variety of aliphatic monoamines having 6 to 12 carbons are effective at controlling solution viscosity.

EXAMPLE 5

Polyurethaneureas were made substantially as in Example 3 but with cyclohexylamine or n-heptylamine at 40 meq/kg of terminator, based on total ingredients. The polyurethaneurea had an intrinsic viscosity of 1.0 dl/g. The isocyanate content of the capped glycol was about 2.60 wt %. The polymer content of the solutions was about 28 wt %. Initial (1 hour) and aged (40° C. without stirring, 24 hours) Falling Ball Viscosities are reported in Table V.

TABLE V

| | Solution Viscosity (poise) | | |
|---|---|---|---|
| | 1 Hour | 24 hours | 48 Hours |
| Cyclohexylamine | 756 | 1379 | 6021 |
| n-Heptylamine | 755 | 1508 | 6359 |

The data in Table V indicate that n-heptylamine is comparable to cyclohexylamine as a chain terminator in providing stable solutions of polyurethaneurea.

EXAMPLE 6

Example 2 was repeated, with the following differences. The poly(tetramethyleneether) glycol contained n-hexanol at a level of 18 meq/kg, based on total ingredients. The mixed chain extender mole ratio was 88/12 ethylene diamine/2-methyl-1,5-pentanediamine. The level of cyclohexylamine fed with the chain extenders was 18 meq/kg, based on total ingredients. The polyurethaneurea had an intrinsic viscosity of 1.01 dl/g and was calculated to have about 18 meq/kg cyclohexylurea ends, 18 meq/kg n-hexylurethane ends, and 22 meq/kg amine ends, based on polymer weight. The polyurethaneurea solution had 36.5 wt % polymer content, and it was heated to 80° C. for dry-spinning. The spinning speed was 870 m/min, the cell wall temperature was 220° C., and the windup stretch was 30%. The resulting 40 denier (44 dtex) spandex had 1.15 dN/tex tenacity, 490% elongation, 0.18 dN/tex load power, 0.03 dN/tex unload power, and 22.5% set. Uniformity results are presented in Table VI.

Comparison Example 4

Example 6 was repeated, with the following differences. No hexanol was added to the poly(tetramethyleneether) glycol, the capped glycol had an NCO content of 2.6 wt % based on total capped glycol, the chain extenders were a mixture of a 90/10 mol ratio of ethylene diamine/2-methyl-1,5-pentanediamine, and the chain terminator was diethylamine, fed at 21 meq/kg based on total ingredients. The polyurethaneurea had an intrinsic viscosity of 1.31 dl/g and was calculated to have about 21 meq/kg diethylurea ends, 15 meq/kg amine ends, and substantially no alkylurethane or monoalkylurea ends, based on polymer weight. The resulting polymer solution had 34.8 wt % polymer content. The cell wall temperature was 240° C., and the windup stretch was 25%. The resulting 40 denier (44 dtex) spandex had 1.28 dN/tex tenacity, 490% elongation, 18 dN/tex load power, 0.03 dN/tex unload power, and 22.6% set. Uniformity results are presented in Table VI.

TABLE VI

| Example | n-Hexanol, meq/kg | Monoamine Compound | Amount meq/kg | CDV |
|---|---|---|---|---|
| 6 | 18 | cyclohexylamine | 18 | 10.9 |
| Comp. 4 | 0 | diethylamine | 21 | 18.5 |

The data in Table VI illustrate the unexpected, large improvement (over 40% CDV reduction) in spandex uniformity obtained when the polyurethaneurea of which the spandex is comprised has both alkylurethane and monoalkylurea ends.

We claim:

1. Spandex comprising a polyurethaneurea which is the reaction product of:
   a) a capped glycol comprising the reaction product of:
      i) a polymeric glycol selected from the group consisting of polyether glycols, polyester glycols, and polycarbonate glycols;
      ii) a diisocyanate; and
      iii) an aliphatic primary monoalcohol comprising 1–10 carbons;
   b) an aliphatic diamine chain extender comprising 2–12 carbons; and
   c) a primary aliphatic monoamine chain terminator comprising 5–12 carbons;
wherein the polyurethaneurea has:
   monoalkylurea ends and alkylurethane ends;
   a ratio of monoalkylurea ends to alkylurethane ends of at least about 0.5:1; and
   a ratio of monoalkylurea ends to alkyurethane ends of at most about 10:1; and wherein the spandex has a coefficient of denier variation which is lower, by at least about 15%, than that of spandex comprising an otherwise identical polyurethaneurea having dialkylurea and amine ends.

2. The spandex of claim 1 wherein:
the polymeric glycol a polyether glycol;
the diisocyanate is an aromatic diisocyanate;
the monoalcohol comprises at least 4 carbons;
the monoalcohol comprises at most 7 carbons;
the diamine is selected from the group consisting of ethylene diamine, 1,2-propanediamine, 2-methyl-1,5-pentanediamine, 1,3-diaminopentane, 1,3-cyclohexanediamine, 1,3-propanediamine, 2,2-dimethyl-1,3-propanediamine, 1-amino-3,3,5-trimethyl-5-aminomethylcyclohexane, and mixtures thereof;
the monoamine comprises at least 6 carbons; and
the monoamine comprises at most 7 carbons.

3. The spandex of claim 1 wherein:
the polymeric glycol is selected from the group consisting of poly(tetramethyleneether) glycol and poly(tetramethylene-ether-co-2-methyltetramethyleneether) glycol; the diisocyanate is selected from the group consisting of 1-isocyanato-4-[(4-isocyanatophenyl)methyl]benzene and mixtures thereof with 1-isocyanato-2-[(4-isocyanatophenyl)methyl]benzene; and
the monoamine is selected from the group consisting of n-hexylamine, cyclohexylamine, 1-amino-3-methylcyclohexane, 1-amino-2-methylcyclohexane, and n-heptylamine.

4. The spandex of claim 1 wherein:
the polymeric glycol is a polyether glycol containing at least about 10 ppm and at most about 125 ppm of a compound selected from the group consisting of acids and acid-producing compounds;
the monoamine comprises at least 6 carbons;
the monoamine comprises at most 7 carbons; and
the spandex has a coefficient of denier variation of at most about 15.

5. The spandex of claim 1 wherein:
the polyurethaneurea has at least about 5 meq/kg alkylurethane ends, based on polyurethaneurea weight; and
the polyurethaneurea has at most about 30 meq/kg alkylurethane ends, based on polyurethaneurea weight.

6. The spandex of claim 1 wherein:
the polyurethaneurea has at least about 2 meq/kg monoalkylurea ends, based on polyurethaneurea weight; and
the polyurethaneurea has at most about 55 meq/kg monoalkylurea ends, based on polyurethaneurea weight.

7. The spandex of claim 1 wherein:
the diisocyanate is a mixture of 1-isocyanato-4-[(4-isocyanatophenyl)-methyl]benzene and 1-isocyanato-2-[(4-isocyanatophenyl)methyl]-benzene wherein:
the 1-isocyanato-2-[(4-isocyanatophenyl)methyl]benzene is present in an amount of at least about 5 mol %, based on total diisocyanate; and
the 1-isocyanato-2-[(4-isocyanatophenyl)methyl]benzene is present in an amount of at most about 30 mol %, based on total diisocyanate;
the capped glycol has an NCO content of at least about 2.0 wt % based on capped glycol;

the capped glycol has an NCO content of at most about 3.5 wt % based on capped glycol; and the diamine is selected from the group consisting of ethylene diamine and mixtures thereof with at most about 10 mole percent, based on total diamines, of a diamine selected from the group consisting of 1,2-propanediamine, 2-methyl-1,5-pentanediamine, 1,3-cyclohexanediamine, and 1,3-diaminopentane.

8. The spandex of claim 1 wherein:

the polymeric glycol is selected from the group consisting of poly(tetramethyleneether) glycol having a number-average molecular weight in the range of about 1500 to 2500 daltons and poly(tetramethylene-ether-co-2-methyltetramethyleneether) glycol having a number-average molecular weight in the range of about 2000 to 4000 daltons;

the diisocyanate is substantially 1-isocyanato-4-[(4'-isocyanatophenyl)-methyl]benzene;

the capped glycol has an NCO content of:

at least about 2.0 wt %, based on total capped glycol, when the polymeric glycol is poly(tetramethyleneether-co-2-methyltetramethyleneether) glycol;

at most about 5.5 wt %, based on total capped glycol, when the glycol is poly(tetramethyleneether-co-2-methyltetramethyleneether) glycol;

at least about 2.5 wt %, based on total capped glycol, when the glycol is poly(tetramethyleneether) glycol; and at most about 6.0 wt %, based on total capped glycol, when the glycol is poly(tetramethyleneether) glycol; and the diamine is a mixture of ethylene diamine with at least about 50 mol % of a diamine, based on total diamines, selected from the group consisting of 2-methyl-1,5-pentanediamine and 1,3-diaminopentane.

9. The spandex of claim 1 wherein the polymeric glycol is poly(2,2-dimethyl-1,3-propane dodecanedioate) glycol.

10. The spandex of claim 1 wherein:

the polymeric glycol is a poly(tetramethylene terephthalate) glycol having a number-average molecular weight of about 1500 to 2500 daltons;

the diisocyanate is substantially 1-isocyanato-4-[(4'-isocyanatophenyl)-methyl]benzene;

the diamine is ethylene diamine mixed with at least about 10 mole percent, based on total diamines, of a second diamine;

the diamine is ethylene diamine mixed with at most about 20 mole percent, based on total diamines, of a second diamine;

the monoamine comprises at least 6 carbons; and the monoamine comprises at most 7 carbons;

wherein the second diamine is selected from the group consisting of 1,2-propanediamine, 2-methyl-1,5-pentanediamine, 1,3-cyclohexanediamine, and 1,3-diaminopentane.

11. A process for making spandex comprising the steps of:

a) providing a polymeric glycol selected from the group consisting of polyether glycols, polyester glycols, and polycarbonate glycols;

b) providing a diisocyanate;

c) providing an aliphatic primary monoalcohol comprising 1–10 carbons;

d) contacting the glycol, diisocyanate, and monoalcohol to form a capped glycol;

e) providing an aliphatic diamine chain extender comprising 2–12 carbons;

f) providing a primary aliphatic monoamine chain terminator comprising 5–12 carbons;

g) contacting the capped glycol, the diamine, and the monoamine in a solvent to form a polyurethaneurea solution; and h) spinning the polyurethaneurea solution to form the spandex, wherein:

a mole ratio of monoamine to monoalcohol is at least about 0.5:1; and a mole ratio of monoamine to monoalcohol is at most about 10:1.

12. The process of claim 11 comprising the steps of:

providing a polyether glycol in step a);

providing an aromatic diisocyanate in step b);

providing a monoalcohol comprising at least 4 carbons in step c);

providing a monoalcohol comprising at most 7 carbons in step c);

selecting the diamine in step e) from the group consisting of ethylene diamine, 1,2-propanediamine, 2-methyl-1,5-pentanediamine, 1,3-diaminopentane, 1,3-cyclohexanediamine, 1,3-propanediamine, 2,2-dimethyl-1,3-propanediamine, 1-amino-3,3,5-trimethyl-5-aminomethylcyclohexane, and mixtures thereof;

providing a monoamine comprising at least 6 carbons in step f); and providing a monoamine comprising at most 7 carbons in step f); and wherein step h) is a dry-spinning step.

13. The process of claim 11 comprising the steps of:

selecting the polymeric glycol in step a) from the group consisting of poly(tetramethyleneether) glycol and poly(tetramethylene-ether-co-2-methyltetramethyleneether) glycol;

selecting the diisocyanate in step b) from the group consisting of 1-isocyanato-4-[(4-isocyanatophenyl)methyl]benzene and mixtures thereof with 1-isocyanato-2-[(4-isocyanatophenyl)methyl]benzene; and selecting the monoamine in step f) from the group consisting of n-hexylamine, cyclohexylamine, 1-amino-3-methylcyclohexane, 1-amino-2-methylcyclohexane, and n-heptylamine.

14. The process of claim 11 comprising the steps of:

providing a polyether glycol in step a);

providing a monoamine comprising at least 6 carbons in step f); and providing a monoamine comprising at most 7 carbons in step f); and further comprising, between steps a) and d), the step of adding to the polyether glycol at least about 10 ppm and at most about 125 ppm of a compound selected from the group consisting of acids and acid-producing compounds.

15. The process of claim 11 comprising the steps of:

providing the monoalcohol in step c) in an amount of at least about 5 meq/kg, based on total ingredients; and providing the monoalcohol in step c) in an amount of at most about 30 meq/kg based on total ingredients.

16. The process of claim 11 comprising the steps of:

providing the monoamine in step f) in an amount of at least about 2 meq/kg based on total ingredients; and providing the monoamine in step f) in an amount of at most about 55 meq/kg, based on total ingredients.

17. The process of claim 11 comprising the steps of:

in step b), providing a mixture of 1-isocyanato4-[(4-isocyanatophenyl)-methyl]benzene and 1-isocyanato-2-[(4-isocyanatophenyl)methyl]-benzene wherein:
  the 1-isocyanato-2-[(4-isocyanatophenyl)methyl] benzene is present in an amount of at least about 5 mol %, based on total diisocyanate; and
  the 1-isocyanato-2-[(4-isocyanatophenyl)methyl] benzene is present in an amount of at most about 30 mol %, based on total diisocyanate;

in step d), forming a capped glycol having an NCO content of at least about 2.0 wt % based on capped glycol;

in step d), forming a capped glycol having an NCO content of at most about 3.5 wt % based on capped glycol; and in step e), selecting the diamine from the group consisting of ethylene diamine and mixtures thereof with at most about 10 mole percent, based on total diamines, of a diamine selected from the group consisting of 1,2-propanediamine, 2-methyl-1,5-pentanediamine, 1,3-cyclohexanediamine, and 1,3-diaminopentane.

18. The process of claim 11 comprising the steps of:

selecting the polymeric glycol in step a) from the group consisting of poly(tetramethyleneether) glycol having a number-average molecular weight in the range of about 1500 to 2500 daltons and poly(tetramethylene-ether-co-2-methyltetramethyleneether) glycol having a number-average molecular weight in the range of about 2000 to 4000 daltons;

in step b), providing substantially 1-isocyanato-4-[(4'-isocyanatophenyl)-methyl]benzene;

in step d), forming a capped glycol having an NCO content of: at least about 2.0 wt %, based on total capped glycol, when the polymeric glycol is poly(tetramethyleneether-co-2-methyltetramethyleneether) glycol;

at most about 5.5 wt %, based on total capped glycol, when the glycol is poly(tetramethyleneether-co-2-methyltetramethyleneether) glycol;

at least about 2.5 wt %, based on total capped glycol, when the glycol is poly(tetramethyleneether) glycol; and at most about 6.0 wt %, based on total capped glycol, when the glycol is poly(tetramethyleneether) glycol; and in step e), providing a mixture of ethylene diamine with at least about 50 mol % of a diamine, based on total diamines, selected from the group consisting of 2-methyl-1,5-pentanediamine and 1,3-diaminopentane.

19. The process of claim 11 comprising providing poly(2,2-dimethyl-1,3-propane dodecanedioate) glycol in step a).

20. The process of claim 11 comprising the steps of:

in step a), providing poly(tetramethylene terephthalate) glycol having a number-average molecular weight of about 1500 to 2500 daltons;

in step b), providing substantially 1-isocyanato-4-[(4'-isocyanatophenyl)-methyl]benzene;

in step e), providing ethylene diamine mixed with at least about 10 mole percent, based on total diamines, of a second diamine;

in step e), providing ethylene diamine mixed with at most about 20 mole percent, based on total diamines, of a second diamine;

providing a monoamine comprising at least 6 carbons in step f); and providing a monoamine comprising at most 7 carbons in step f);

wherein the second diamine is selected from the group consisting of 1,2-propanediamine, 2-methyl-1,5-pentanediamine, 1,3-cyclohexanediamine, and 1,3-diaminopentane.

\* \* \* \* \*

UNITED STATES PATENT AND TRADEMARK OFFICE
CERTIFICATE OF CORRECTION

PATENT NO. : 6,503,996 B1  Page 1 of 1
DATED : January 7, 2003
INVENTOR(S) : Donald S. Bretches It is certified that error appears in the above-identified patent and that said Letters Patent is hereby corrected as shown below:

<u>Title page,</u>
Item [73], Assignee, "DuPont Dow Elastomers L.L C." should read -- E.I. Dupont de Nemours And Company. --

Signed and Sealed this

Eighth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,503,996 B1  
DATED : January 7, 2003  
INVENTOR(S) : Donald S. Bretches Page 1 of 1

It is certified that error appears in the above-identified patent and that said Letters Patent is hereby corrected as shown below:

<u>Title page,</u>
Item [73], Assignee, "DuPont Dow Elastomers L.L C." should read -- E.I. duPont de Nemours and Company, Wilmington, DE (US) --.

This certificate supersedes Certificate of Correction issued June 8, 2004.

Signed and Sealed this

Nineteenth Day of October, 2004

JON W. DUDAS  
*Director of the United States Patent and Trademark Office*